UNITED STATES PATENT OFFICE.

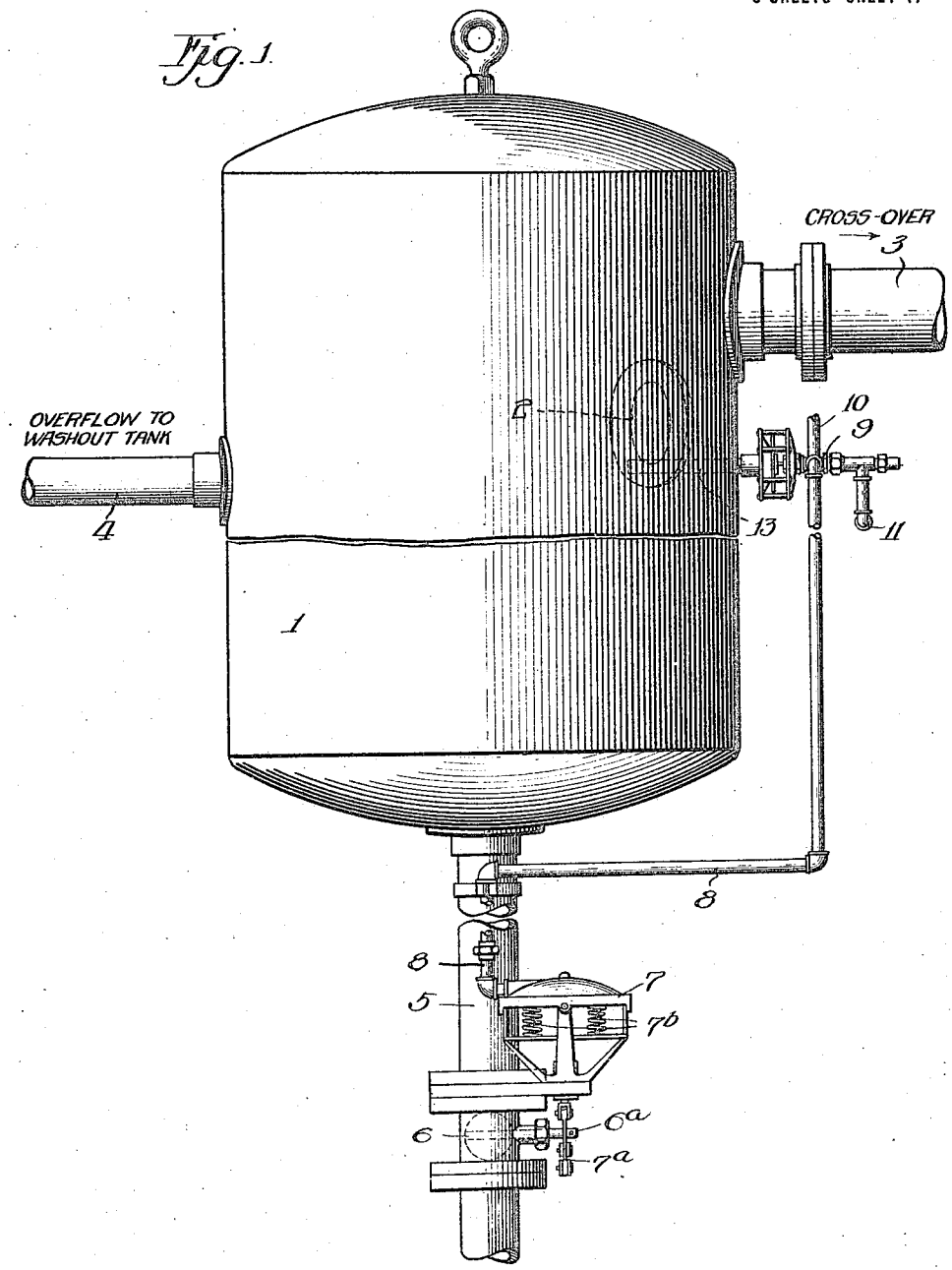

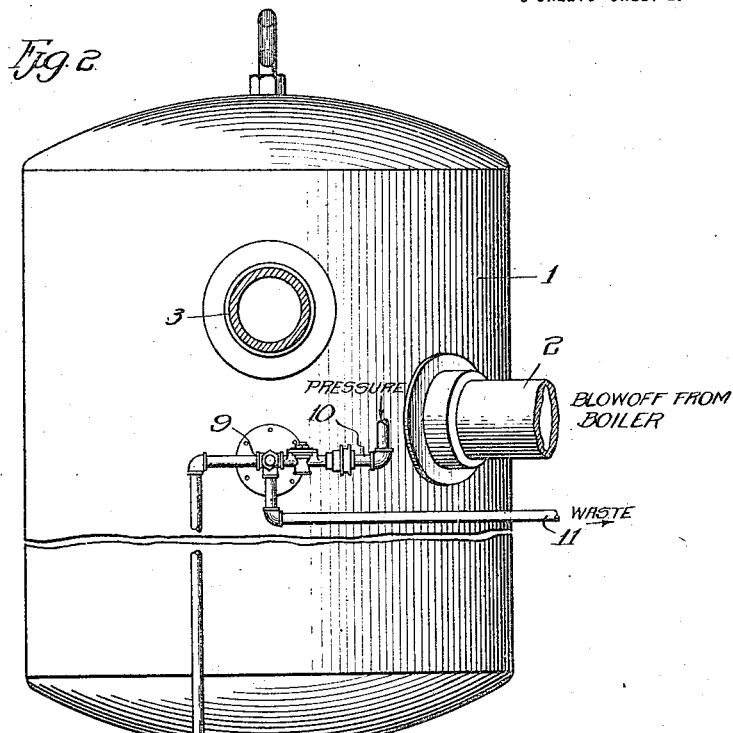
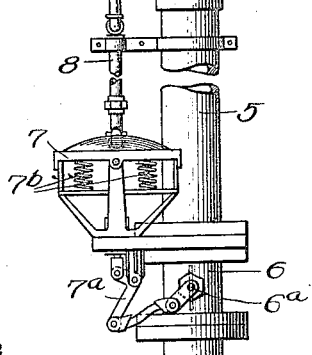
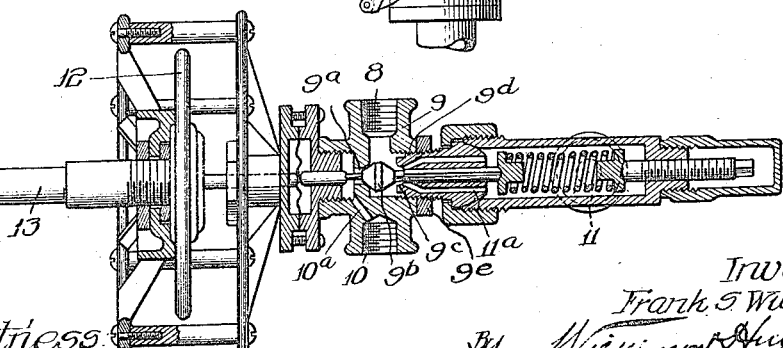

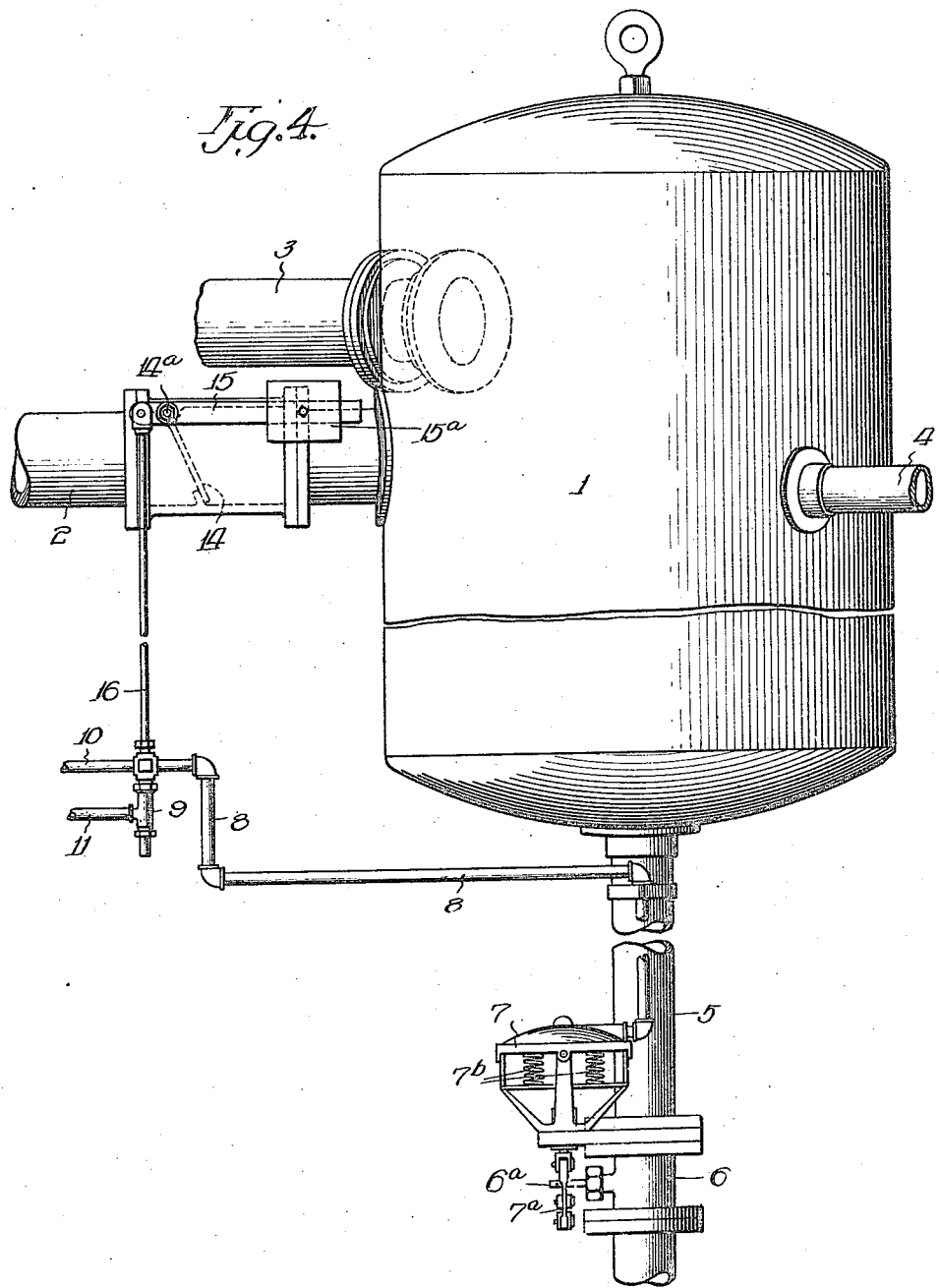

FRANK S. WICHMAN, OF CHICAGO, ILLINOIS.

SEPARATOR FOR BOILER-WASHING SYSTEMS.

1,416,538. Specification of Letters Patent. Patented May 16, 1922.

Application filed September 12, 1919. Serial No. 323,446.

*To all whom it may concern:*

Be it known that I, FRANK S. WICHMAN, a citizen of the United States, residing at Chicago, in the county of Cook and State of Illinois, have invented certain new and useful Improvements in Separators for Boiler-Washing Systems, of which the following is a specification.

This invention relates to systems of apparatus whereby in cleaning boilers, and especially locomotive boilers, water and steam blowing off from the boiler may be separated into sludge or refuse discharged to the sewer, wash water which is collected in one tank for washing out the boiler preliminary to refilling it, and vapor or steam which, for the sake of conserving heat units therein as well as the water of which it is composed, is conducted away, condensed, and added to the water of a filling tank.

The present invention consists in certain improvements in the separator used in such a system, and has for its object to provide a separator which will automatically discharge the sludge or refuse settling in the bottom thereof, after the steps of drawing off the steam and vapor and permitting the overflow of the wash water have been completed. The arrangement is preferably such that the first portion of the blowoff water entering the separator is also discharged in advance of trapping any of the water for separation purposes.

In carrying out the invention, a valve is arranged in the sludge pipe of the separator, and this valve is automatically controlled by the blowoff water or steam through the medium of a thermostat affected by the temperature thereof, or a pressure vane or gate affected by impact or current of the same.

In the accompanying drawings—

Figures 1 and 2 are two views of the separator with the improvements embodied therein, as seen from positions at right angles to each other;

Figure 3 is a detail view of the three-way pilot valve as arranged for control by the thermostat, and which in turn controls the supply of actuating pressure medium (steam, water or air) to the diaphragm of the sludge pipe valve; and Figure 4 is a detail view illustrating the application of the current vane or gate to the blowoff pipe as a means for actuating the three-way valve.

1 represents the separator which is of usual construction, being provided with pipe 2 through which it receives blowoff water from the boiler, cross-over pipe 3 through which it delivers steam or vapor for condensation in a part of the system not shown, pipe 4 through which water overflows into the washout tank, and a discard pipe 5 through which the sediment or sludge can escape from the bottom of the separator to the sewer.

According to the present invention, pipe 5 is provided with a valve 6 which may be in the form of a so-called butterfly valve, being a disk rotatable upon a horizontal axis to and from position to close the pipe. Valve 6 is controlled through its stem 6$^a$ by a pressure diaphragm 7 connected with said stem through the lever system 7$^a$, and having return springs 7$^b$. Diaphragm 7 is subjected to pressure through a pipe 8 which leads from a three-way pilot valve 9 adapted to open pipe 8 to a pressure medium supplied through a pipe 10, or to cut it off from pipe 10 and open it to a waste pipe 11. The valve 9 may be of any one of a number of constructions adapted to perform the functions stated. For instance, it may have the construction shown in Figure 3, according to which pressure pipe 10 is connected by port 10$^a$ to the space outside of the seat 9$^a$, so that when the bulb 9$^b$ is moved against the seat 9$^a$ the pressure medium will be cut off from pipe 8, and said pipe will communicate past the seat 9$^c$ and through the passage 11$^a$ to the waste pipe 11. Bulb 9$^b$ in leaving seat 9$^a$ is closed upon the seat 9$^c$ and thereupon closes the pipe 8 to exhaust and opens it to the pressure pipe 10.

In order to operate the bulb 9$^b$ automatically it is moved in one direction by a spring 9$^d$ and in the other direction by a diaphragm 12, which is subjected to the pressure of an expanding medium in the thermostat bulb 13. Presentation of bulb 13 into the separator in position to encounter hot water or steam accumulating therein makes the pressure of such expanding medium thereby subject to the presence or absence of heated medium in the separator.

The operation of the device is as follows:

Whenever the bulb 13 is cooled below a predetermined temperature, pipe 8 is open to waste pipe 11, and spring 7$^b$ may press the diaphragm 7 and so move the butterfly valve 6 into the position shown in dotted lines in Figures 1 and 2, and thereby open the pipe 5 and freely discharge whatever is in the separator. This condition prevails at the beginning of the blow-off of a locomotive when the scale, sludge, and other precipitate are being driven out from the lower portion of the boiler to which the blowoff hose is usually attached. This condition will continue for a time dependent upon the reluctance in the heating up of bulb 13 sufficiently to move the diaphragm 12 and shift the bulb $9^b$ of the valve 9; or dependent partly or wholly, as may be desired, upon the reluctance in building up valve-actuating pressure in pipe 8 (determined by the capacity of opening between seat $9^a$ and bulb $9^b$ in valve 9). By this time the principal part of the refuse from the bottom of the boiler will have been discharged through pipe 5 to the sewer, and the valve 6 may now be safely closed to permit the water to accumulate in the separator. This it does so that the water can reach the overflow pipe 4 and pass over into the washout tank. During the entire period steam and vapor are rising rapidly and being drawn off through cross-over pipe 3. Valve 6 will remain closed, and the water as well as the steam and vapor will be disposed of as described until the locomotive boiler is empty and water level is re-established in the separator at the lower side of pipe 4. Water remaining in the separator will now cool down until the temperature drops sufficiently to contract the expansible medium in bulb 13 and permit the spring $9^d$ to shift the valve bulb $9^b$ to cut off pipe 8 from the pressure medium and open it to waste. Valve 6 will now be opened by spring 7 and the water in the separator below the overflow pipe 4 will be discharged to the sewer. Its volume may be sufficient to render unnecessary subsequent flushing of the sludge pipe.

Any convenient available fluid under pressure may be utilized as the pressure medium supplied through pipe 10; for instance, steam from the main that supplies the pumps of the system, water in the ordinary supply system or tapped from some circulating pipe that normally carries a head of pressure, or air derived under pressure from some source.

According to Figure 4 the three-way valve 9, instead of being actuated by the temperature effect of the blowoff water or steam acting through thermostat bulb 13 and diaphragm 12, is arranged to respond to the presence of the blowoff water through the medium of vane or gate 14 swinging upon shaft $14^a$ in the blowoff pipe 2, and acting through the medium of lever 15 upon a push-rod 16 that controls the valve 9. Normally, counterbalance $15^a$ holds the push-rod 16 out of pressure upon valve 9 and permits the same to cut off pressure medium from pipe 8 and diaphragm 7. But when blowoff water or steam flows against vane 14, rod 16 is depressed, valve bulb $9^b$ is displaced from seat $9^a$, and pressure medium accumulates in pipe 8 to close the butterfly valve. The reluctance of pressure-building over diaphragm 7 may be wholly relied upon in this case to delay closing of butterfly valve 6 until after scale and precipitate have escaped. This reluctance can be conveniently predetermined by adjusting the distance between valve seats $9^a$ and $9^c$ and constant capacity of valve opening. This adjustment is provided for by carrying valve seat $9^c$ on the nipple $9^d$ and having the latter threaded into the valve shell and provided with lock nut $9^e$ to maintain its adjustment.

I claim:

1. In a separator for boiler washing systems, adapted to separate sludge from water, a discard pipe, a normally open closure for said discard pipe, means delivering water to be separated, and means actuated by the presence of such water, adapted to actuate said closure to arrest delivery to such discard pipe.

2. In a separator for boiler washing systems, adapted to separate sludge from water, a discard pipe, a normally open closure for said discard pipe, means delivering water to be separated, and means actuated by the presence of such water, adapted to actuate said closure to arrest delivery to such discard pipe; such closure-actuating means having a reluctance of action which permits the initial delivery of such water to pass to the discard pipe.

3. In a separator adapted to separate sludge from water, a sludge pipe adapted to drain the separator, a normally open valve in said sludge-pipe, and means controlled by the delivery of water to be separated, adapted to close said valve.

4. In a separator adapted to separate sludge from water, a sludge pipe adapted to drain the separator, a normally open valve in said sludge-pipe, and means controlled by the delivery of water to be separated, adapted to close said valve; such valve-closing means being timed to effect closure of the valve only after initial delivery of water has been discarded.

5. In a separator adapted to separate sludge from water, a pipe for draining the separator, a normally open sludge valve in said pipe, a fluid pressure controlled actuator for said sludge valve, a valve delivering pressure medium to said actuator, and means actuated by the presence of water to be separated, adapted to control the pressure medium valve.

6. In a separator adapted to separate sludge from water, a pipe for draining the separator, a normally open sludge valve in said pipe, a fluid pressure controlled actuator for said sludge valve, a valve delivering pressure medium to said actuator, and means actuated by the presence of water to be separated, adapted to control the pressure medium valve; the pressure medium valve having means for choking it and developing therein a reluctance in the delivery of fluid pressure medium to the sludge valve actuator.

7. In a boiler washing system, a separator having a pipe for delivery of blowoff water, a pipe for overflow of wash water therefrom, and a pipe for draining it; a sludge valve in the drainage pipe; a pressure diaphragm controlling the sludge-valve; a valve controlling supply of pressure medium to said diaphragm; and means controlled by said delivery of blowoff water, adapted to actuate the pressure medium valve.

8. In a separator, an overflow pipe, a sludge pipe, a valve in the sludge pipe, a diaphragm controlling the sludge pipe valve, a pipe supplying pressure medium to said diaphragm, a three-way pilot valve for opening said pressure pipe to a pressure medium or to waste, and automatic means for controlling said pilot valve which is itself controlled by the delivery of fluid to the separator.

9. In a boiler washing system, a separator having an overflow pipe for water to be saved, a sludge pipe for refuse to be discarded, a valve in said sludge pipe, and thermostatic controlling means for said valve subject to the temperature within the separator.

10. In a water separator, an overflow pipe, a sludge pipe, a valve in the sludge pipe, a pressure diaphragm controlling the sludge pipe valve, a pilot valve controlling the application of pressure medium to said diaphragm, and a thermostat controlling said pilot valve and positioned to respond to the temperature of water supplied to the separator.

Signed at Chicago, Illinois, this 28th day of August, 1919.

FRANK S. WICHMAN.